US012651477B2

(12) United States Patent
Han et al.

(10) Patent No.: US 12,651,477 B2
(45) Date of Patent: *Jun. 9, 2026

(54) ELECTRONIC DEVICE COMPRISING OPTICAL SENSOR MODULE

(71) Applicant: SAMSUNG ELECTRONICS CO., LTD., Suwon-si (KR)

(72) Inventors: Junhee Han, Suwon-si (KR); Hanul Moon, Suwon-si (KR); Soohwan Kim, Suwon-si (KR); Seungjae Bae, Suwon-si (KR); Inho Shin, Suwon-si (KR); Jiyoung Lim, Suwon-si (KR); Yongwon Cho, Suwon-si (KR); Jiwoo Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 1 day.

This patent is subject to a terminal disclaimer.

(21) Appl. No.: 18/655,939

(22) Filed: May 6, 2024

(65) Prior Publication Data

US 2024/0290129 A1 Aug. 29, 2024

Related U.S. Application Data

(63) Continuation of application No. 17/985,596, filed on Nov. 11, 2022, now Pat. No. 11,978,276, which is a
(Continued)

(30) Foreign Application Priority Data

May 13, 2020 (KR) ........................ 10-2020-0056997

(51) Int. Cl.
G06K 9/00 (2022.01)
G06F 1/16 (2006.01)
G06V 40/13 (2022.01)

(52) U.S. Cl.
CPC ............ G06V 40/13 (2022.01); G06F 1/1633 (2013.01)

(58) Field of Classification Search
CPC .............. G06V 40/13; G06V 40/1312; G06V 40/1318; G06F 1/1633; H05K 1/118
See application file for complete search history.

(56) References Cited

U.S. PATENT DOCUMENTS 9,710,689 B2 7/2017 Evans, V et al.
10,515,251 B2 12/2019 Cai
(Continued)

FOREIGN PATENT DOCUMENTS

CN 108962025 A 12/2018
JP 5597583 B2 10/2014
(Continued)

OTHER PUBLICATIONS

Korean Office Action Issued In KR Application No. 10-2020-0056997; Mail Date Oct. 10, 2024; 11 Pages.
(Continued)

*Primary Examiner* — Abdul-Samad A Adediran
(74) *Attorney, Agent, or Firm* — CANTOR COLBURN LLP

(57) ABSTRACT

According to various embodiments, an electronic device is provided and includes a housing, a support frame which is arranged in an internal space of the housing and has a first surface, a second surface facing a direction opposite to the first surface, and a through hole, a display supported by the first surface and arranged to be seen from outside through at least a part of the housing, and an optical sensor module arranged in the second surface to face the through hole.

19 Claims, 14 Drawing Sheets

Related U.S. Application Data continuation of application No. PCT/KR2021/003969, filed on Mar. 31, 2021.

(56) References Cited

U.S. PATENT DOCUMENTS

| | | |
|---|---|---|
| 2012/0249459 A1 | 10/2012 | Sashida et al. |
| 2017/0372123 A1 | 12/2017 | Kim et al. |
| 2018/0089492 A1 | 3/2018 | Cai |
| 2018/0160545 A1 | 6/2018 | Kim et al. |
| 2018/0365472 A1 | 12/2018 | Cai |
| 2019/0053377 A1 | 2/2019 | Lee et al. |
| 2019/0213373 A1 | 7/2019 | Kim et al. |
| 2019/0251325 A1* | 8/2019 | Park ........................ H05K 1/118 |
| 2019/0272407 A1 | 9/2019 | Park et al. |
| 2019/0281708 A1 | 9/2019 | Franklin et al. |
| 2019/0303640 A1* | 10/2019 | Song .................. G06V 40/1312 |
| 2020/0117034 A1 | 4/2020 | Yin et al. |
| 2020/0265757 A1 | 8/2020 | Zhang et al. |
| 2020/0401779 A1* | 12/2020 | Ling .................. G06V 40/1318 |
| 2023/0063624 A1 | 3/2023 | Han et al. |

FOREIGN PATENT DOCUMENTS

| | | | |
|---|---|---|---|
| KR | 101218277 | B1 | 1/2013 |
| KR | 101415063 | B1 | 7/2014 |
| KR | 20160071352 | A | 6/2016 |
| KR | 101841583 | B1 | 3/2018 |
| KR | 20180044837 | A | 5/2018 |
| KR | 20190016630 | A | 2/2019 |
| KR | 20190026024 | A | 3/2019 |
| KR | 20190085660 | A | 7/2019 |
| KR | 20190095872 | A | 8/2019 |
| KR | 20190098537 | A | 8/2019 |

OTHER PUBLICATIONS

International Search Report and Written Opinion for International Application No. PCT/KR2021/003969; International Filing Date Mar. 31, 2021; Date of Mailing Jul. 1, 2021; 51 Pages.

* cited by examiner

ELECTRONIC DEVICE COMPRISING OPTICAL SENSOR MODULE

CROSS-REFERENCE TO RELATED APPLICATION(S)

This application is a continuation application of U.S. patent application Ser. No. 17/985,596, filed on Nov. 11, 2022, which is a continuation application, claiming priority under § 365 (c), of International Application No. PCT/KR2021/003969, filed on Mar. 31, 2021, which is based on and claims the benefit of a Korean patent application number 10-2020-0056997, filed on May 13, 2020, in the Korean Intellectual Property Office, the disclosure of which is incorporated by reference herein in its entirety.

BACKGROUND

1. Field

Various embodiments of the disclosure relate to an electronic device including an optical sensor module.

2. Description of Related Art

To secure competitiveness with other manufacturers, electronic devices are gradually becoming slimmer and are being developed to increase rigidity, strengthen design aspects, and to differentiate functional elements thereof.

At least one electronic component, such as a sensor module disposed in an inner space of an electronic device, may require an efficient arrangement structure considering surrounding structures to exhibit optimal performance.

SUMMARY

An electronic device may include a fingerprint sensor module as an optical sensor module disposed in an inner space and used as user authentication means. The fingerprint sensor module may be arranged under a display occupying substantially an entire area of a front surface of the electronic device to detect a user's fingerprint that comes into contact with or approaches the fingerprint sensor module through at least a partial area of the display. For example, the fingerprint sensor module may include an image sensor, which is disposed in the inner space of the module housing and receives light reflected via the user's fingerprint. In some embodiments, the fingerprint sensor module may be disposed in the inner space of the module housing, and may include a light-emitting unit configured to emit light through the display and a light-receiving unit configured to detect light reflected via the user's fingerprint and entering through the display. The electronic device may detect the user's unique fingerprint information according to valleys and ridges formed on a finger via the fingerprint sensor module, and determine whether to authenticate based on comparison of the fingerprint information with a pre-stored fingerprint.

The electronic device may include a support frame disposed in an inner space thereof, and a display supported by the support frame and disposed to be at least partially visible from the exterior. The fingerprint sensor module may be disposed on a bracket (or a rear frame) disposed separately from the support frame in the inner space of the electronic device to face a through-hole formed in the support frame and to emit light toward the display through the through-hole. Furthermore, a printed circuit board electrically connected to the fingerprint sensor module may be disposed at a position spaced apart from the support frame in the inner space of the electronic device.

However, the fingerprint sensor module, which is disposed in the inner space of the electronic device separately from the support frame supporting the display, may be deteriorated in terms of a fingerprint recognition rate. This can occur because, when a display is pressed for sensing operation, a separation distance between the display and the fingerprint sensor module can be changed due to partial deformation of the display and the support frame. Moreover, a structure in which the separation distance between the display and the fingerprint sensor module is changed may lead to or exhibit a malfunction such as a short circuit or a poor electrical connection between the fingerprint sensor module and the printed circuit board.

Various embodiments of the disclosure provide an electronic device including an optical sensor module configured to ensure operational reliability.

According to various embodiments, an electronic device may include: a housing; a support frame disposed in an inner space of the housing and including a first surface, a second surface facing away from the first surface, and a through-hole; a display supported by the first surface and disposed to be visible from an exterior through at least a portion of the housing; and an optical sensor module disposed on the second surface to face the through-hole.

According to various embodiments, an electronic device may include: a housing; a display disposed to be visible from the outside through at least a portion of the housing; a support frame disposed under the display in the inner space of the housing and including a through-hole; and an optical sensor module fixed to the support frame to face the through-hole under the support frame.

According to exemplary embodiments of the disclosure, an adaptively compressed structure in which, since the fingerprint sensor module as an optical sensor module is disposed together on a support frame, which supports the display, the separation distance between the display and the fingerprint sensor module is kept constant even when the display and the support frame are partially deformed by a pressing operation for fingerprint sensing. Thus, it is possible to always implement an excellent fingerprint recognition rate.

In addition, according to exemplary embodiments of the disclosure, since the printed circuit board of the electronic device is disposed together on the support frame, which supports the display, it is possible to implement a reliable electrical connecting structure between the printed circuit board and the fingerprint sensor module even when the display and the support frame are partially deformed due to frequent pressing operations for fingerprint sensing.

In addition, various effects directly or indirectly identified through the disclosure may be provided.

BRIEF DESCRIPTION OF THE DRAWINGS

In connection with the description of the drawings, the same or similar components may be denoted by the same or similar reference numerals.

FIG. 10 is a block diagram of an electronic device including a fingerprint sensor module according to various embodiments of the disclosure.

DETAILED DESCRIPTION

Figure 1:
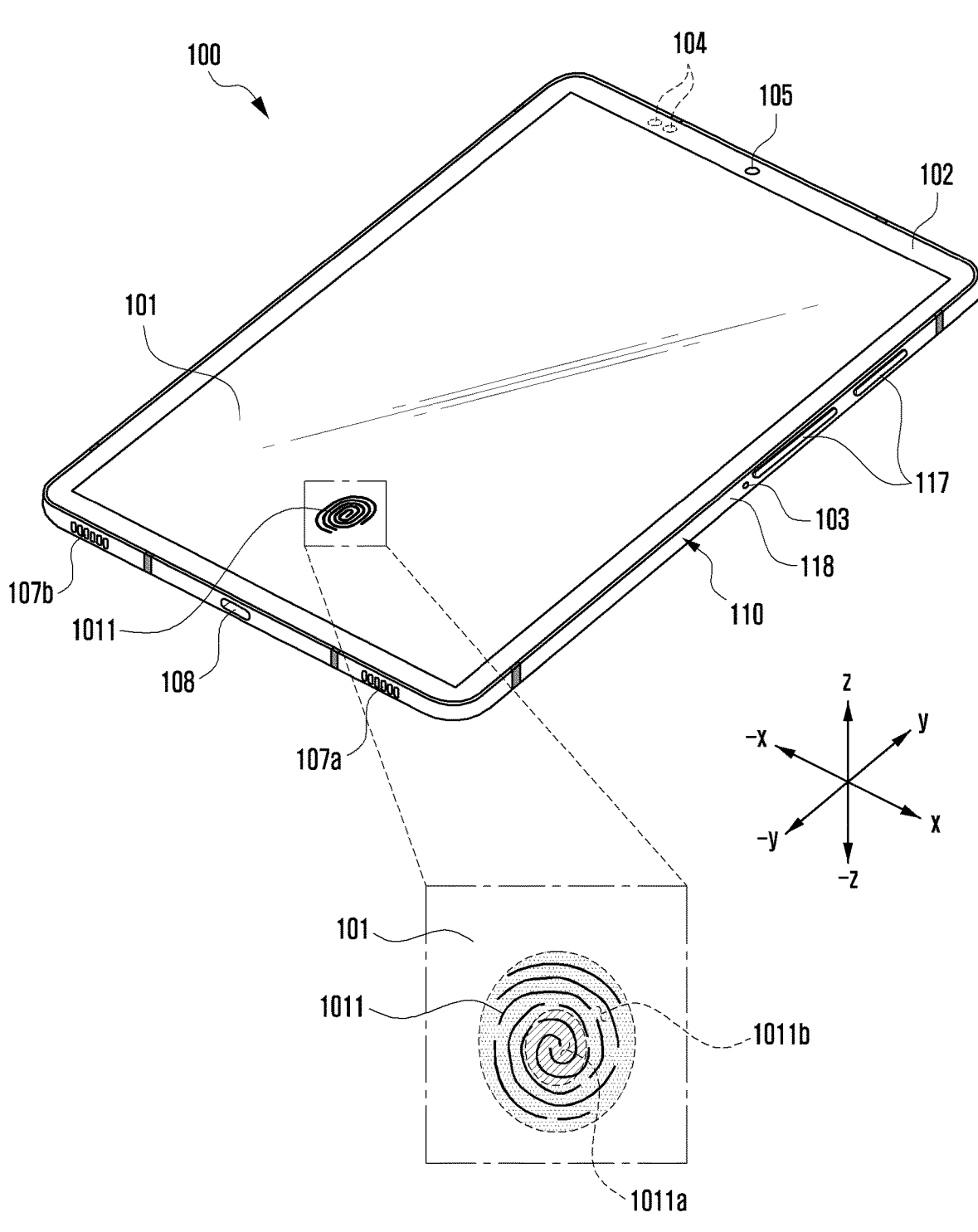
FIG. 1 is a perspective view illustrating a front surface of an electronic device according to various embodiments of the disclosure.
Figure 2:
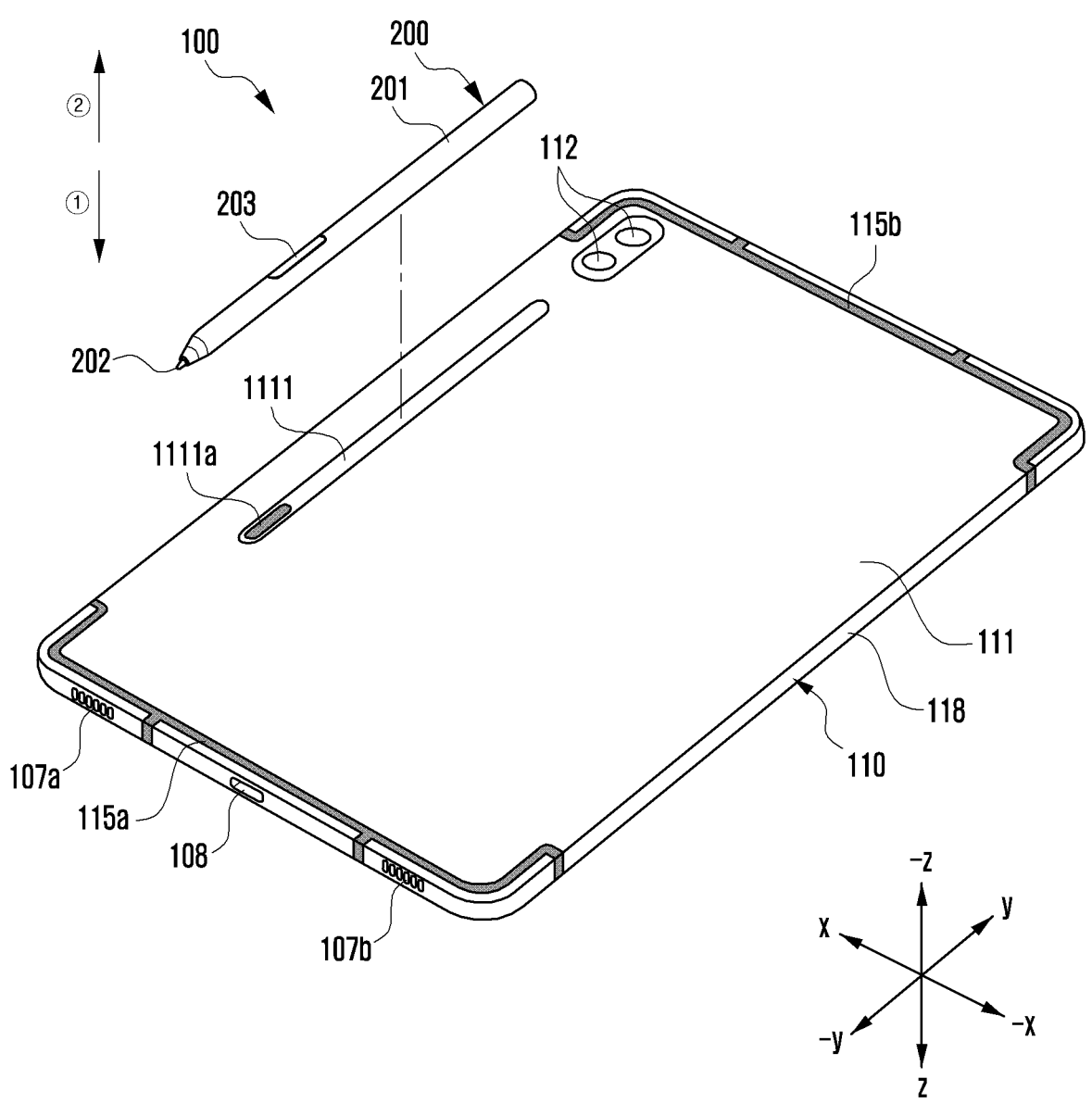
FIG. 2 is a perspective view illustrating a rear surface of the electronic device of FIG. 1 according to various embodiments of the disclosure.

FIG. 1 is a perspective view illustrating a front surface of an electronic device 100 according to various embodiments of the disclosure. FIG. 2 is a perspective view illustrating a rear surface of the electronic device 100 of FIG. 1 according to various embodiments of the disclosure.

Referring to FIGS. 1 and 2, an electronic device 100 according to an embodiment may include a housing 110 including a front cover 102 (e.g., a front plate or a front window) oriented in a first direction (the z-axis direction), a rear cover 111 (e.g., a rear plate or a rear window) oriented in a direction (the −z-axis direction) opposite to the first direction and a side member 118 surrounding the inner space (e.g., the inner space 1001 in FIG. 3) or the interior between the front cover 102 and the rear cover 111. According to an embodiment, the front cover 102 may be made of a glass plate or a polymer plate including various coating layers. According to an embodiment, the rear cover 111 may be made of, for example, coated or colored glass, ceramic, polymer, metal (e.g., aluminum, stainless steel (STS), or magnesium), or a combination of two or more of these materials. According to an embodiment, the side member 118 may be coupled to the front cover 102 and the rear cover 111 and may be configured as a side bezel structure including a metal and/or a polymer. In some embodiments, the rear cover 111 and the side member 118 may be configured integrally, and may be made of the same material (e.g., a metal material such as aluminum or magnesium).

According to various embodiments, the electronic device 100 may include at least one of a display 101, at least one input device 103, sound output devices 107a and 107b, a sensor module 104, a camera module 105 and 112, a key input device 117, and a connector port 108. In some embodiments, in the electronic device 100, at least one of the above-mentioned components (e.g., the key input devices 117) may be omitted, or other components may be additionally included. According to an embodiment, the display 101 may be visually exposed through a substantial portion of, for example, the front cover 102. In another embodiment, the display 101 may be exposed through substantially the entire area of the front cover 102. In some embodiments, the distance between the periphery of the display 101 and the periphery of the front cover 102 may be substantially constant to increase the exposed area of the display 101. In some embodiments, the display 101 may have a recess or opening formed in a portion of the screen display area, and at least one of the above-mentioned components may be disposed in the inner space of the electronic device 100 to be aligned with the recess or opening. In another embodiment, in the inner space (e.g., the inner space 1001 of FIG. 3) of the electronic device 100, under the screen display area (e.g., an active area) of the display 101 and/or under the front cover 102, at least one of a sensor module 104, a camera module 105, a fingerprint sensor module (e.g., the fingerprint sensor module 130 in FIG. 3) or a light-emitting device (not illustrated) may be included. In another embodiment, the display 101 may be coupled to or disposed adjacent to a touch-sensitive circuit, a pressure sensor capable of measuring the intensity (pressure) of a touch, and/or an electromagnetic field induction panel (e.g., a digitizer) configured to detect a magnetic field-type electronic pen (e.g., a stylus pen).

According to various embodiments, the input device 103 may include at least one microphone module 103. In some embodiments, the input device 103 may include a plurality of microphone modules 103 disposed at different positions to detect the direction of sound. The sound output devices 107a and 107b may include a speaker module. The speaker modules 107a and 107b may include an external speaker and/or a call receiver.

According to various embodiments, at least one sensor module 104 may generate an electrical signal or a data value corresponding to an internal operating state of the electronic device 100 or an external environmental state. The at least one sensor module 104 may include, for example, a proximity sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to various embodiments, the key input devices 117 may be disposed to be at least partially exposed through the side member 118 of the housing 110. In some embodiments, the electronic device 100 may not include some or all of the above-described key input devices 117, and a key input device 117, which is not included in the above-mentioned key input devices, may be implemented on the display 101 in the form of a soft key. In some embodiments, a key input device 117 may be implemented by using a pressure sensor included in the display 101. In some embodiments, a key input device 117 may include at least one pressure-responsive key, which is disposed inside the electronic device 100 and uses a strain gauge that measures a pressure change due to the pressing of the side member 118. According to one embodiment, the connector port 108 may accommodate a connector port (e.g., a receptacle) (e.g., a USB connector port or an IF connector port) for transmitting/receiving power, data, and/or sound signals with an external electronic device.

According to various embodiments, the camera modules 105 and 112 may include a front camera module 105 disposed to be exposed to the exterior through the front cover 102 of the electronic device 100 and a rear camera module 112 disposed to be exposed to the exterior through the rear cover 111. According to an embodiment, the camera modules 105 and 112 may each include one or more lenses, an image sensor, and/or an image signal processor. According to an embodiment, the rear camera module 112 may include a plurality of camera modules and may perform multi-camera functions for general photographing, wide-angle photographing, close-up photographing, telephoto photographing, and/or ultra-wide-angle photographing. In some embodiments, the rear camera module 112 may further include or be replaced with a time of flight (TOF) camera and/or a light detection and ranging (LiDAR) scanner.

According to various embodiments, the electronic device 100 may include an electronic pen 200, which is detachably disposed on the pen seat portion 1111 provided in at least a partial area of the rear cover 111. According to an embodiment, the electronic pen 200 may include a hollow pen housing 201 having a length, and a pen tip 202 disposed at an end of the pen housing 201. According to an embodiment, the electronic pen 200 may include a key button 203 disposed in at least a partial area of the pen housing 201. According to an embodiment, the electronic pen 200 may be attached to the pen seat portion 1111 by using the magnetic force of at least one magnet. According to an embodiment, the electronic pen 200 may include a battery (not illustrated) disposed inside the pen housing 201 and used for short-range wireless communication (e.g., Bluetooth communication). According to an embodiment, the electronic pen 200 may include a coil member (not illustrated) for electromagnetic induction and/or wireless charging, and the battery may be charged via a wireless charging portion 1111a disposed in the pen seat portion 1111 of the electronic device 100 by using a coil member. According to an embodiment, the detection method of the electronic pen 200 may include an electro-magnetic resonance (EMR) method, an active electrical stylus (AES) method, or an electric coupled resonance (ECR) method.

According to various embodiments, in the electronic device 100, one or more unit conductive members are split by non-conductive members 115a and 115b (e.g., polymer) disposed on at least a portion of the rear cover 111 and/or the side member 118. The split unit conductive members may be used as antennas operating in at least one frequency band.

According to various embodiments, when an authentication request is detected, the electronic device 100 may control the display 101 to display a fingerprint authentication interface 1011 configured to guide a user to a fingerprint contact area. According to an embodiment, the fingerprint authentication interface 1011 may be displayed at a position that overlaps a fingerprint sensor module (e.g., the fingerprint sensor module 130 in FIG. 3) when the display 101 is viewed from above (e.g., in the z-axis direction). According to an embodiment, the fingerprint authentication interface 1011 may include various types of objects that are displayed to be recognizable by the user via the display 101. According to an embodiment, the display 101 may be set to display gradient-type brighter lighting areas 1011a and 1011b with at least one color in an area corresponding to the fingerprint authentication interface 1011. According to an embodiment, the brighter lighting areas 1011a and 1011b may include a first brighter lighting area 1011a displayed in an area including at least the fingerprint authentication interface, and a second brighter lighting area 1011b disposed at least partially surround the first brighter lighting area 1011a. According to an embodiment, the brighter lighting areas 1011a and 1011b may be set as a gradient type in which saturation/brightness is adjusted in the same color from the first brighter lighting area 1011a to the second brighter lighting area 1011b. For example, the fingerprint authentication interface 1011 may be set to gradually become brighter or darker from the first brighter lighting area 1011a toward the second brighter lighting area 1011b. In some embodiments, the display 101 may display only the fingerprint authentication interface 1011 in a normal state. In some embodiments, the display 101 may be set to adjust the brightness of each area in a gradient type when a fingerprint is near, in addition to the fingerprint authentication interface 1011. In some embodiments, the brighter lighting areas 1011a and 1011b may have the same size as the fingerprint authentication interface 1011, or may be displayed to be smaller or larger than the fingerprint authentication interface 1011. In some embodiments, the brighter lighting areas 1011a and 1011b may be set to be displayed in an area corresponding to a touch input in real time.

Figure 3:
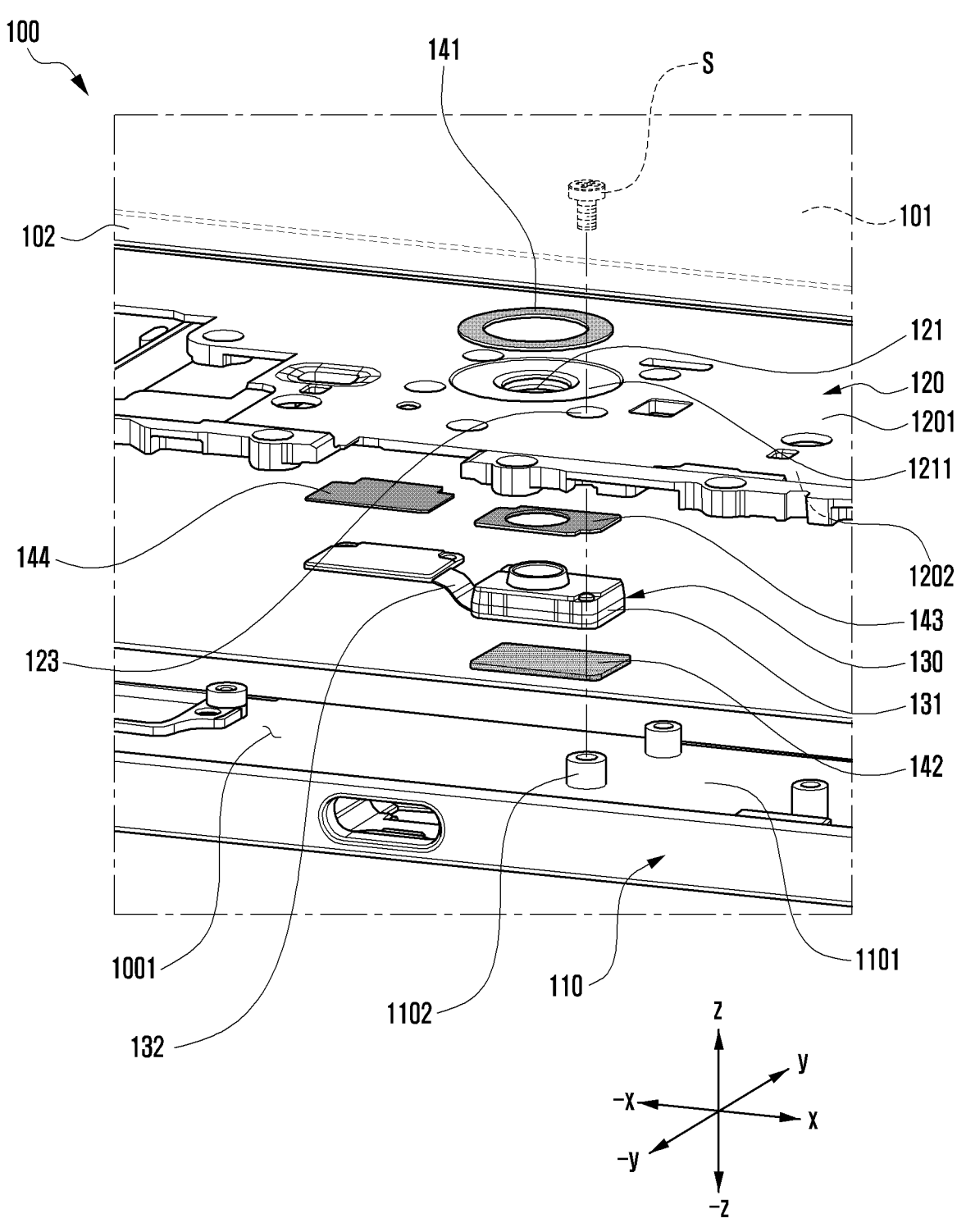
FIG. 3 is an exploded perspective view of an electronic device including a fingerprint sensor module according to various embodiments of the disclosure.
Figure 4:
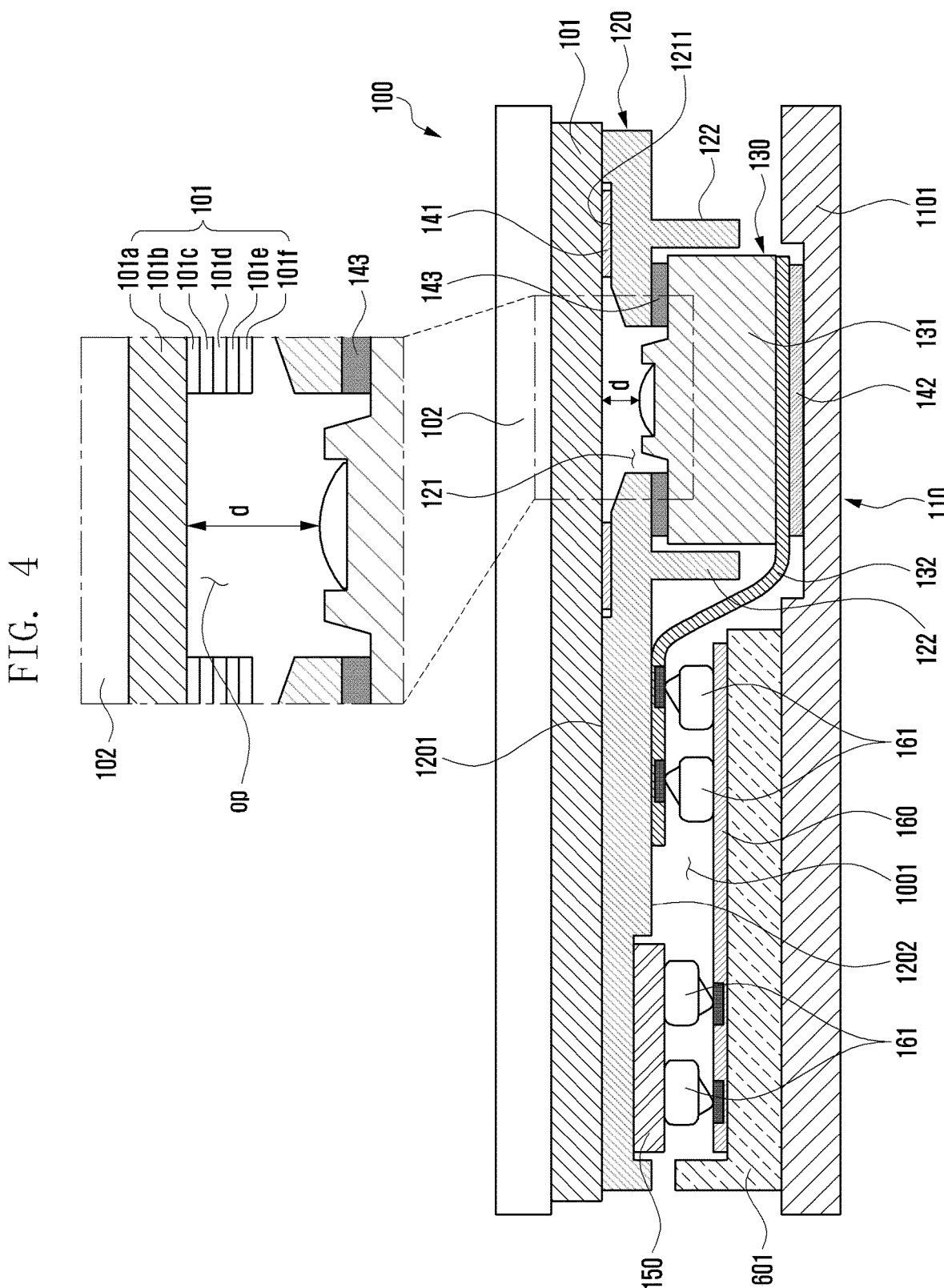
FIG. 4 is a partial cross-sectional view of an electronic device in which a fingerprint sensor module according to various embodiments of the disclosure is disposed.

FIG. 3 is an exploded perspective view of an electronic device 100 including a fingerprint sensor module 130 according to various embodiments of the disclosure. FIG. 4 is a partial cross-sectional view of the electronic device 100 in which the fingerprint sensor module 130 according to various embodiments of the disclosure is disposed.

Referring to FIG. 3, the electronic device 100 may include a housing 110, a support frame 120 disposed in an inner space 1001 of the housing 110, a display 101 supported by the support frame 120 and to be visible from the exterior through at least a partial area of the housing 110, a fingerprint sensor module 130 as an optical sensor module disposed in the inner space 1001 of the electronic device 100 to be at least partially supported by the support frame 120 and a rear frame 1101 configured to support at least a portion of the fingerprint sensor module 130. According to an embodiment, the rear frame 1101 may include a rear cover (e.g., the rear cover 111 in FIG. 2) applied to at least a portion of the rear surface of the electronic device 100. In some embodiments, the rear frame 1101 may be disposed in the inner space 1001 or interior of the electronic device 100 as a support bracket separately from the rear cover (e.g., the rear cover 111 in FIG. 2). According to an embodiment, the support frame 120 is disposed in the inner space 1001 or the interior of the housing 110, and may include a first surface 1201 oriented in a first direction (e.g., the z-axis direction) and a second surface 1202 oriented in a second direction (e.g., the −z-axis direction) opposite to the first direction. According to an embodiment, the display 101 may be disposed in a manner of being stacked on the rear surface of the front cover 102 (e.g., a glass window or a polymer window) made of a transparent material coupled to the housing 110. According to an embodiment, the support frame 120 may include a through-hole 121 (e.g., an opening) formed to penetrate from the first surface 1201 to the second surface 1202. According to an embodiment, the support frame 120 may be formed of a metal and/or a polymer, and may have a structure that is helpful for reinforcing the rigidity of the electronic device 100.

According to various embodiments, the fingerprint sensor module 130 may be disposed on the second surface 1202 of the support frame 120 at a position facing the through-hole

121. According to an embodiment, the fingerprint sensor module 130 may include a module housing 131, an image sensor (not illustrated) disposed in the inner space of the module housing 131 and configured to receive light reflected from a fingerprint, and a flexible printed circuit board (FPCB) 132 drawn to a predetermined length in a predetermined shape from the module housing 131. According to an embodiment, the fingerprint sensor module 130 may be disposed such that the module housing 131 is attached to the second surface 1202 of the support frame 120 via an adhesive tape 143. In some embodiments, the fingerprint sensor module 130 may be disposed such that the module housing 131 is fixed to the second surface 1202 of the support frame 120 through bonding, welding, screw-fastening, or structural coupling (e.g., a snap-fit coupling structure). According to an embodiment, the fingerprint sensor module 130 may be electrically connected, via the FPCB 132, to a printed circuit board (PCB) (e.g., the printed circuit board 150 in FIG. 4) disposed on the second surface 1202 of the support frame 120. According to an embodiment, the FPCB 132 may be at least partially attached to the second surface 1202 of the support frame 120 via an adhesive tape 144. In some embodiments, the electronic device 100 may have an additional support structure for the fingerprint sensor module 130 disposed on the second surface 1202 of the support frame 120. For example, the support frame 120 includes one or more screw through-holes 123 disposed at a predetermined interval around the through-hole 121. According to an embodiment, the rear frame 1101 may include screw fastening bushes 1102 extending toward the support frame (in the positive z-axis direction) at positions corresponding to the one or more screw through-holes 123. Accordingly, by fastening the screws S penetrated through the screw through-holes 123 to the screw fastening bushes 1102, the fingerprint sensor module 130 disposed between the support frame 120 and the rear frame 1101 may be firmly supported.

According to various embodiments, the electronic device 100 may include a pressure dispersion unit 141 disposed between the first surface 1201 of the support frame 120 and the display 101 in the vicinity of the through-hole 121. According to an embodiment, the pressure dispersion unit 141 may be configured to evenly transmit compressive pressure applied by the user to the support frame 120. According to an embodiment, the pressure dispersion unit 141 may disperse the pressure applied to the display 101 and/or the through-hole 121 portion in the support frame 120 according to the compressive pressure applied by the user to prevent deformation of the corresponding area, which may be helpful for minimizing the deformation of the corresponding area. In some embodiments, increasing an area of the pressure dispersion unit 141 can lead to an increased uniform dispersion ratio of the compressive pressure. According to an embodiment, the pressure dispersion unit 141 may be disposed to surround at least a portion of the through-hole 121. In some embodiments, the pressure dispersion unit 141 may be disposed in a loop shape at least partially surrounding the through-hole 121. In some embodiments, the pressure dispersion unit 141 may be disposed in a closed loop shape that completely surrounds the through-hole 121. According to an embodiment, the support frame 120 may include a recess 1211 formed to be lower than the first surface 1201 to compensate for the thickness of the pressure dispersion unit 141 disposed around the through-hole 121. According to an embodiment, the recess 1211 may be configured to have a depth that makes the outer surface of the pressure dispersion unit 141 and the first surface 1201 flush with each other when the pressure dispersion unit 141 is disposed in the recess 1211. According to an embodiment, the pressure dispersion unit 141 may be disposed such that one surface is fixed to the recess 1211 via an adhesive member (e.g., an adhesive tape or a bonding member) and the other surface supports the display 101 without a separate adhesive member. In some embodiments, the pressure dispersion unit 141 may be attached to the display 101 via an adhesive member. According to an embodiment, the pressure dispersion unit 141 may include a single-sided sealing tape attached to the recess 1211. According to an embodiment, the pressure dispersion unit 141 may be formed of a sponge-based elastic material. In some embodiments, the pressure dispersion unit 141 may be formed of a black color-based material to prevent visibility from the exterior through the display 101. In some embodiments, the pressure dispersion unit 141 may be formed of a material of the same color series as that of the support frame 120.

According to various embodiments, the electronic device 100 may include a buffer unit 142 disposed between the module housing 131 of the fingerprint sensor module 130 and the rear frame 1101 and configured to be fixed or attached to at least a portion (bottom) of the module housing 131. According to an embodiment, the buffer unit 142 may include a tape member made of an elastic material attached to the rear frame 1101 and the module housing 131. In some embodiments, the buffer unit 142 may include an elastic material such as rubber, urethane, or silicone interposed between the rear frame 1101 and the module housing 131 of the fingerprint sensor module 130. According to an embodiment, the buffer unit 142 may be disposed in the recess 1211 formed to be lower than the outer surface of the rear frame 1101 to provide an adhesive position and prevent movement after attachment. According to an embodiment, the buffer unit 142 may also be formed of an elastic material. According to an embodiment, the buffer unit 142 may be formed of an elastic material having relatively high compressibility as compared to the pressure dispersion unit 141.

Exemplary embodiments of the disclosure have been illustrated and described with reference to a fingerprint sensor module disposed under the display 101 in the inner space of the electronic device 100, but are not limited thereto. For example, an optical sensor module such as a biometric sensor, a camera, and/or an illuminance/proximity sensor disposed under the display 101 may also have substantially the same arrangement structure.

Referring to FIG. 4, in the assembled state of the electronic device 100, the display 101 may be supported by the first surface 1201 of the support frame 120, and the fingerprint sensor module 130 may be supported by the second surface 1202 of the support frame 120. In this case, the fingerprint sensor module 130 may be disposed at a position facing the display 101 through the through-hole 121 formed in the support frame 120. According to an embodiment, the fingerprint sensor module 130 may be disposed to have a predetermined separation distance d from the display 101 through the through-hole 121.

According to various embodiments, the electronic device 100 may include a printed circuit board 150 spaced apart from the fingerprint sensor module 130 at a predetermined interval and disposed on the second surface 1202 of the support frame 120. In some embodiments, the printed circuit board 150 may be disposed on the rear frame 1101 via a coupling member such as a screw. According to an embodiment, the fingerprint sensor module 130 may be electrically connected to the printed circuit board 150 via the FPCB 132 drawn out from the module housing 131 of the fingerprint sensor module 130. According to an embodiment, the electronic device 100 may include a bridge board (bridge substrate) 160 fixed to the rear frame 1101 and electrically interconnecting the fingerprint sensor module 130 and the printed circuit board 150. In some embodiments, the bridge board 160 may be disposed on the rear frame 1101 or may be disposed to have a height via the guide member 1601 configured integrally with the rear frame 1101. The bridge board 160 may be easily electrically connected to the FPCB 132 of the printed circuit board 150 and the fingerprint sensor module 130 by being compensated for the height and determined in arrangement position via the guide member 1601. According to an embodiment, the bridge board 160 may include a flexible board (e.g., FPCB) or a rigid board (PCB) attached to the rear frame 1101. According to an embodiment, the bridge board 160 may electrically and elastically interconnect the FPCB 132 of the fingerprint sensor module 130 fixed to the second surface 1202 of the support frame 120 and the printed circuit board 150 via an electrical connecting member 161. According to an embodiment, the electrical connecting member 161 may include at least one of a C-clip, a pogo pin, or a conductive tape which physically and electrically interconnect the bridge board 160 and the FPCB 132, and the bridge board 160 and the printed circuit board 150. According to an embodiment, the printed circuit board 150 may be electrically connected to the FPCB 132 of the fingerprint sensor module 130 via the bridge board 160 even if the printed circuit board 150 is spaced apart from the fingerprint sensor module 130 by a predetermined distance due to a design constraint, and may adaptively respond to an electrical disconnection phenomenon caused by deformation due to the compressive pressure of the display 101 by being elastically connected via the electrical connecting member 161.

According to various embodiments, the electronic device 100 may include a support wall 122 protruding from the second surface 1202 toward the rear frame 1101 and disposed to surround at least a portion of the through-hole 121. According to an embodiment, since the fingerprint sensor module 130 is supported by the support wall 122, it is possible to prevent the fingerprint sensor module 130 from inadvertently moving due to a compressive pressure and from being misaligned with the through-hole 121. In some embodiments, since the support wall 122 is provided to extend to the rear frame 1101 in the assembled state of the electronic device 100, it is possible to prevent the display 101 and/or the support frame 120 from being excessively compressed. In some embodiments, to prevent the excessive compressing, the support frame 120 may be fixed via a screw penetrating the support frame 120 and fastened to the rear frame 1101.

According to various embodiments, the printed circuit board 150 may be fixed to the second surface 1202 of the support frame 120 through taping, bonding, screw coupling, or welding. According to an embodiment, by being disposed on the support frame 120 together with the fingerprint sensor module 130, the printed circuit board 150 moves together with the fingerprint sensor module 130 in response to the compressive pressure for fingerprint sensing, which may be helpful for preventing an electrical connection failure phenomenon such as short circuit due to the relative movement between the FPCB 132 and the printed circuit board 150.

According to various embodiments, the display 101 may include a display panel 101a and at least one auxiliary material layer sequentially disposed under the front cover 102. According to an embodiment, the at least one auxiliary material layer may include one or more polymer members 101b and 101c disposed on the rear surface of the display panel 101a, at least one functional member 101d disposed on the rear surfaces of the one or more polymer members 101b and 101c, and a conductive member 101f disposed on the rear surface of the at least one functional member 101d. According to an embodiment, the one or more polymer members 101b and 101c may include a light blocking layer 101b configured to remove air bubbles that may be generated between the display panel 101a and attachments under the same and to block light generated from the display panel 431 or light incident from the exterior and/or a buffer layer 101c disposed for impact buffering. According to an embodiment, the at least one functional member 101d may include a heat dissipation sheet (e.g., graphite sheet) for dissipating heat, an antenna radiator for communication, a conductive/non-conductive tape, and/or an open cell sponge. According to an embodiment, the conductive member 101f, which is a metal sheet layer (e.g., a metal plate), may be helpful for reinforcing the rigidity of the electronic device 100, and may be used to block ambient noise and disperse heat emitted from surrounding heat dissipating components. According to an embodiment, the conductive member 101f may include Cu, Al, Mg, SUS, or CLAD (e.g., a stacked member in which SUS and Al are alternately disposed). In some embodiments, the display 101 may further include a detection member 101e configured to detect an input by an electromagnetic induction-type writing member (e.g., a stylus pen). According to an embodiment, the detection member 101e may include a digitizer. According to an embodiment, the detection member 101e may be disposed between the one or more polymer member 1101b and 101c and the functional member 101d. In another embodiment, the detection member 445 may be disposed between the display panel 101a and the one or more polymer members 101b and 101c. According to an embodiment, in the auxiliary material layer disposed under the display panel 101a, the area corresponding to the fingerprint sensor module 130 may include a perforated opening OP to receive light reflected from a fingerprint and introduced into the fingerprint sensor module 130. In some embodiments, the transmittance of the area corresponding to the fingerprint sensor module 130 of the display panel 101a may be determined by adjusting the arrangement density of pixels and/or wiring lines. According to an embodiment, the distance d between the display 101 and the fingerprint sensor module 130 may mean the distance d between the display panel 101a and the fingerprint sensor module 130.

Figure 5A:
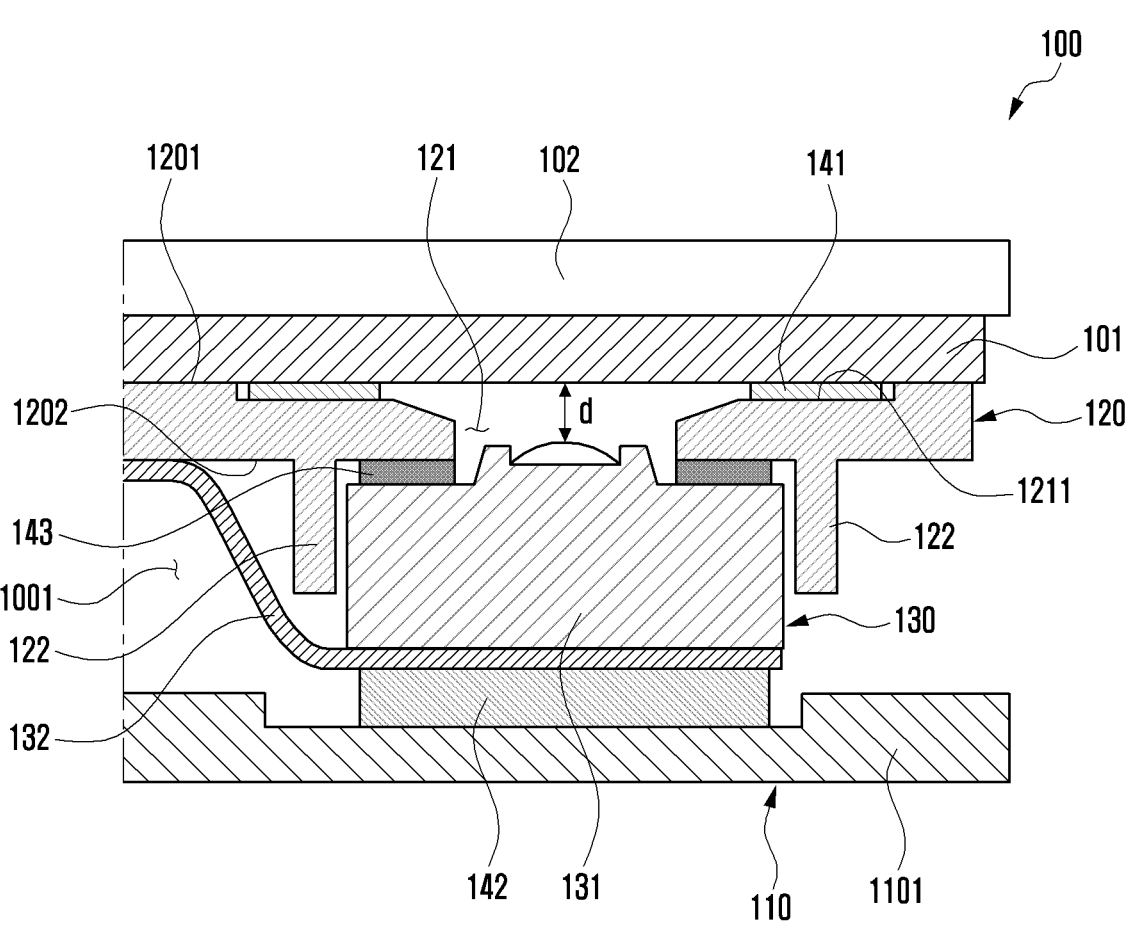
FIGS. 5A and 5B are views illustrating, in comparison, changes in the separation distance between the fingerprint sensor module and the display due to the compressed operation of the display according to various embodiments of the disclosure.
Figure 5B:
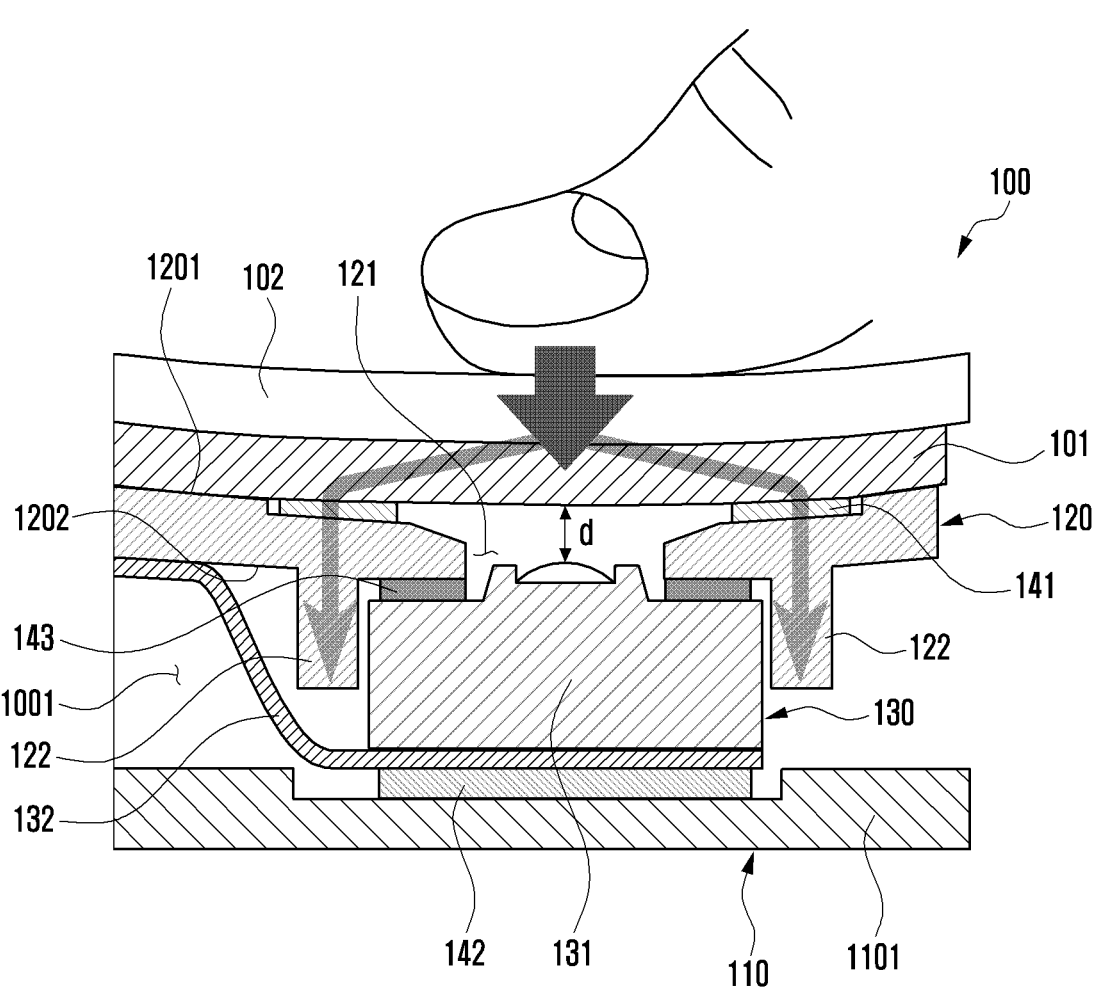

FIGS. 5A and 5B are views illustrating changes in the separation distance d between the fingerprint sensor module 130 and the display 101 due to the compressed operation of the display 101 for comparison and according to various embodiments of the disclosure.

Referring to FIG. 5A, the fingerprint sensor module 130 may be disposed in the inner space 1001 of the electronic device 100 and fixed to the support frame 120 supporting the display 101. In this case, the module housing 131 of the fingerprint sensor module 130 may be fixed to face the through-hole 121 in the second surface 1202 of the support frame 120, and disposed to be elastically supported via the buffer unit 142 disposed on the rear frame 1101. According to an embodiment, the fingerprint sensor module 130 fixed to the second surface 1202 of the support frame 120 may be disposed to have a predetermined separation distance d from the display 101 through the through-hole 121. The separation distance d may be determined in consideration of transmittance and optimum light reflection efficiency of the corresponding area of the display 101 facing the through-hole 121. Accordingly, when the separation distance d is changed, the fingerprint recognition rate of the fingerprint sensor module 130 may be deteriorated.

Referring to FIG. 5B, when the upper surface of the front cover 102 is compressed by the user for fingerprint authentication, the display 101 and the support frame 120 may be deformed by the compressive pressure. In this case, since the fingerprint sensor module 130 is fixed to the second surface 1202 of the support frame 120, the fingerprint sensor module 130 is movable in adaptive response to the deformation of the support frame 120. Thus, the separation distance d between the display 101 and the fingerprint sensor module 130 may be unchangeable or at least substantially resistant to change. According to an embodiment, the adaptively compressed structure of the fingerprint sensor module 130, in which the fingerprint sensor module 130 moves together in response to the deformation of the support frame 120, may be helpful for exhibiting the optimal sensing ability via the fingerprint sensor module 130.

According to various embodiments, the pressure dispersion unit 141 and the buffer unit 142 may also be formed of an elastic material. According to an embodiment, the buffer unit 142 may be formed of an elastic material having relatively higher compressibility than the pressure dispersion unit 141. Therefore, when the support frame 120 is compressed via the display 101, the buffer unit 142 is compressed by a relatively greater degree, so that the separation distance d between the display 101 and the fingerprint sensor module 130 may be kept substantially constant.

Figure 5C:
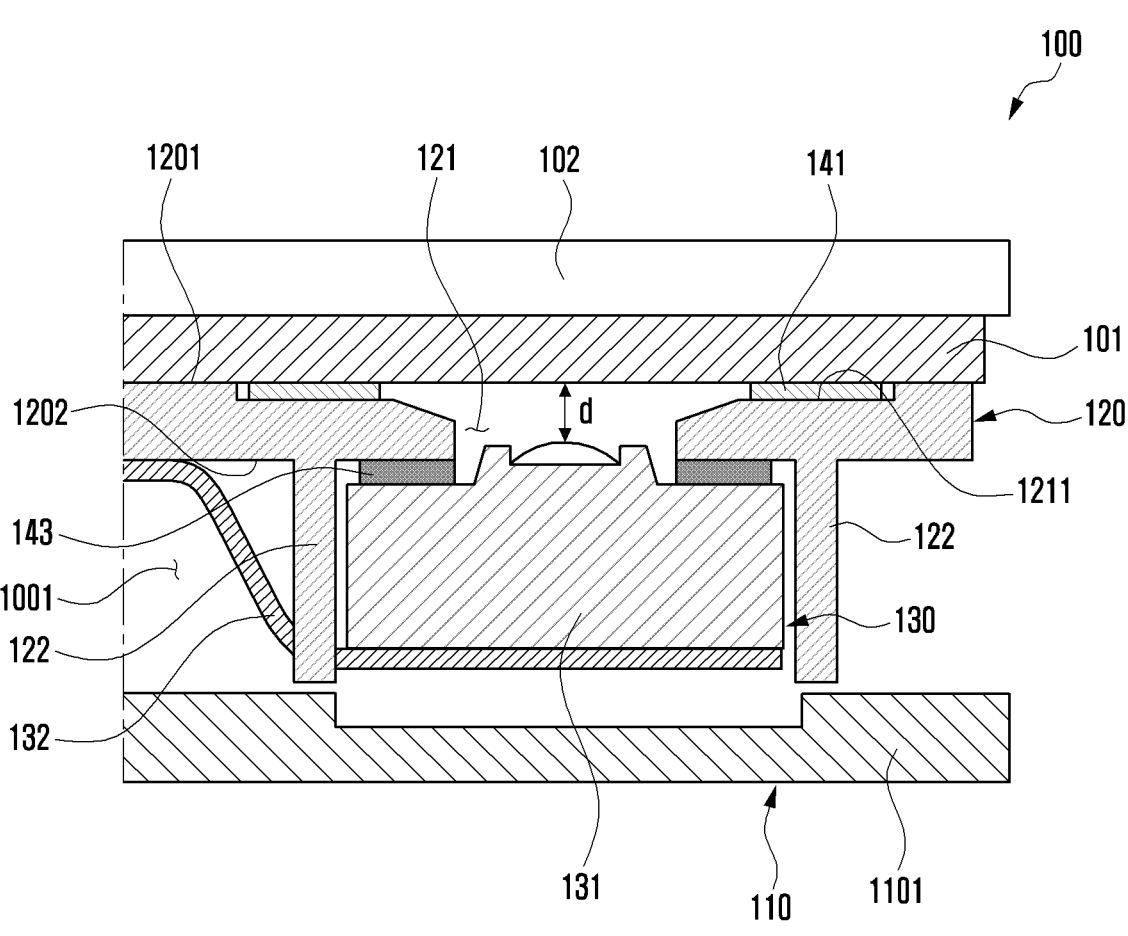
FIG. 5C is a partial cross-sectional view of the electronic device in which the fingerprint sensor module according to various embodiments of the disclosure is disposed.

FIG. 5C is a partial cross-sectional view of an electronic device 100 in which a fingerprint sensor module 130 according to various embodiments of the disclosure is disposed.

Referring to FIG. 5C, the electronic device 100 may include a fingerprint sensor module 130 in which the buffer unit 142 supporting the module housing 131 is omitted. In this case, the fingerprint sensor module 130 may maintain the state of being spaced apart from the rear frame 1101 at a predetermined interval while being fixed to the second surface 1202 of the support frame 120. This may be possible, for example, when the fingerprint sensor module 130 has a fixing structure that is capable of being firmly fixed to the second surface 1202 of the support frame 120 (e.g., a fixing structure for the module housing 131 via a screw).

According to various embodiments, the support wall 122 may extend from the support frame 120 to the vicinity of the rear frame 1101. In this case, the support wall may be applied as a compression limiting structure in which, when the display 101 is compressed, the support wall 122 is first brought into contact with the rear frame 1101 before the fingerprint sensor module 130 is brought into contact with the rear frame 1101. In some embodiments, to strengthen the fixing force, the fingerprint sensor module 130 may be fixed to the support frame 120 through screw fastening or another similar fastening mechanism.

Figure 6:
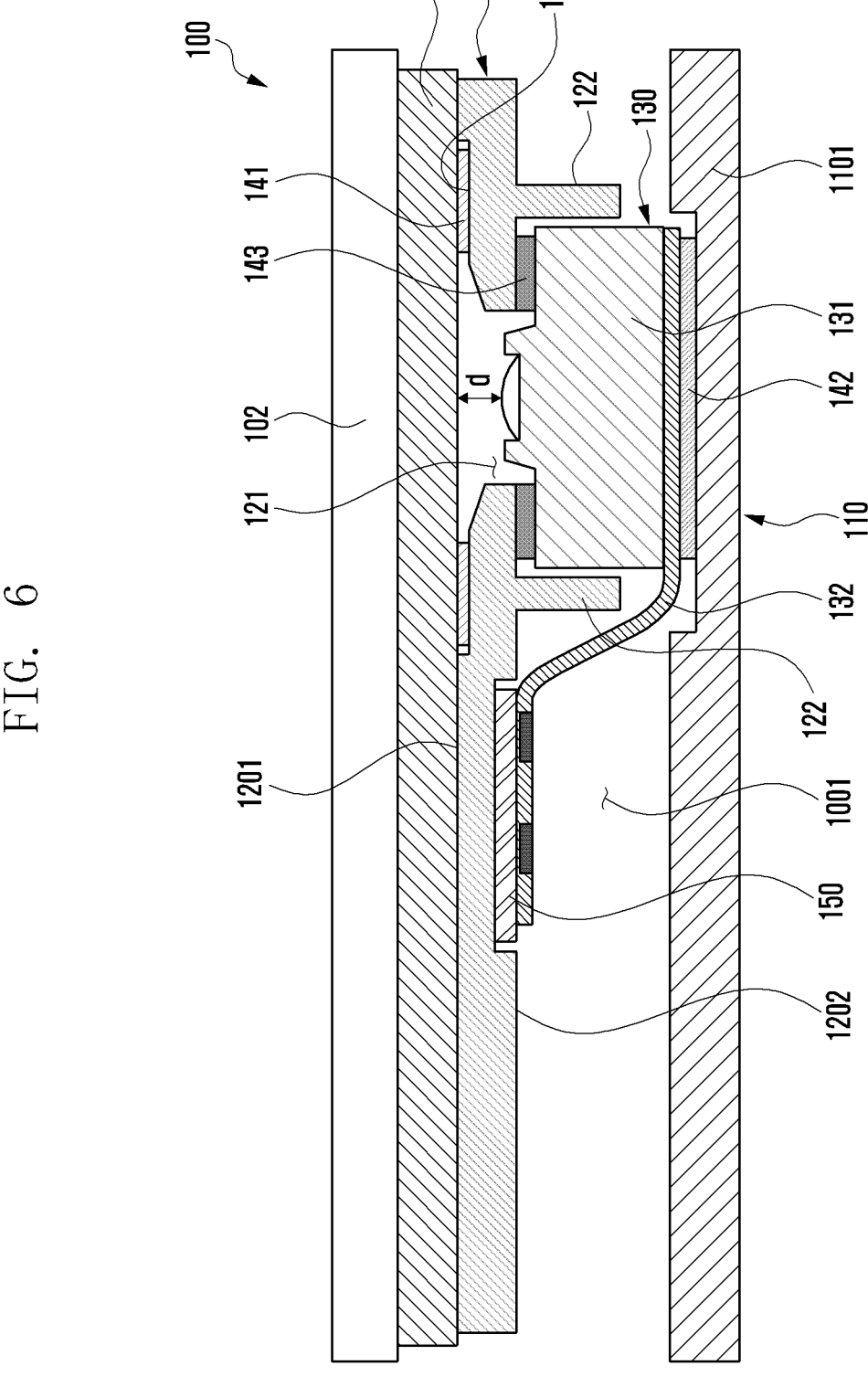
FIG. 6 is a partial cross-sectional view of an electronic device in which a fingerprint sensor module according to various embodiments of the disclosure is disposed.

FIG. 6 is a partial cross-sectional view of an electronic device 100 in which a fingerprint sensor module 130 according to various embodiments of the disclosure is disposed.

In describing the electronic device 100 of FIG. 6, the same reference numerals are assigned to components substantially the same as those of the electronic device 100 of FIG. 4, and a detailed description thereof may be omitted.

Referring to FIG. 6, the FPCB 132 drawn out from the module housing 131 of the fingerprint sensor module 130 may be directly electrically connected to the printed circuit board 150 disposed on the second surface 1202 of the support frame 120. In this case, the FPCB 132 may be electrically connected to the printed circuit board 150 through connector coupling. In some embodiments, the FPCB 132 may be electrically connected to the exposed terminals of the printed circuit board 150 through soldering or conductive bonding. According to an embodiment, since the fingerprint sensor module 130 is fixed to the second surface 1202 of the support frame 120 together with the printed circuit board 150, the fingerprint sensor module 130 is movable by adaptively responding to the deformation of the support frame 120. Therefore, it may be possible to prevent poor connection such as electrical short circuit between the FPCB 132 and the printed circuit board 150.

Figure 7A:
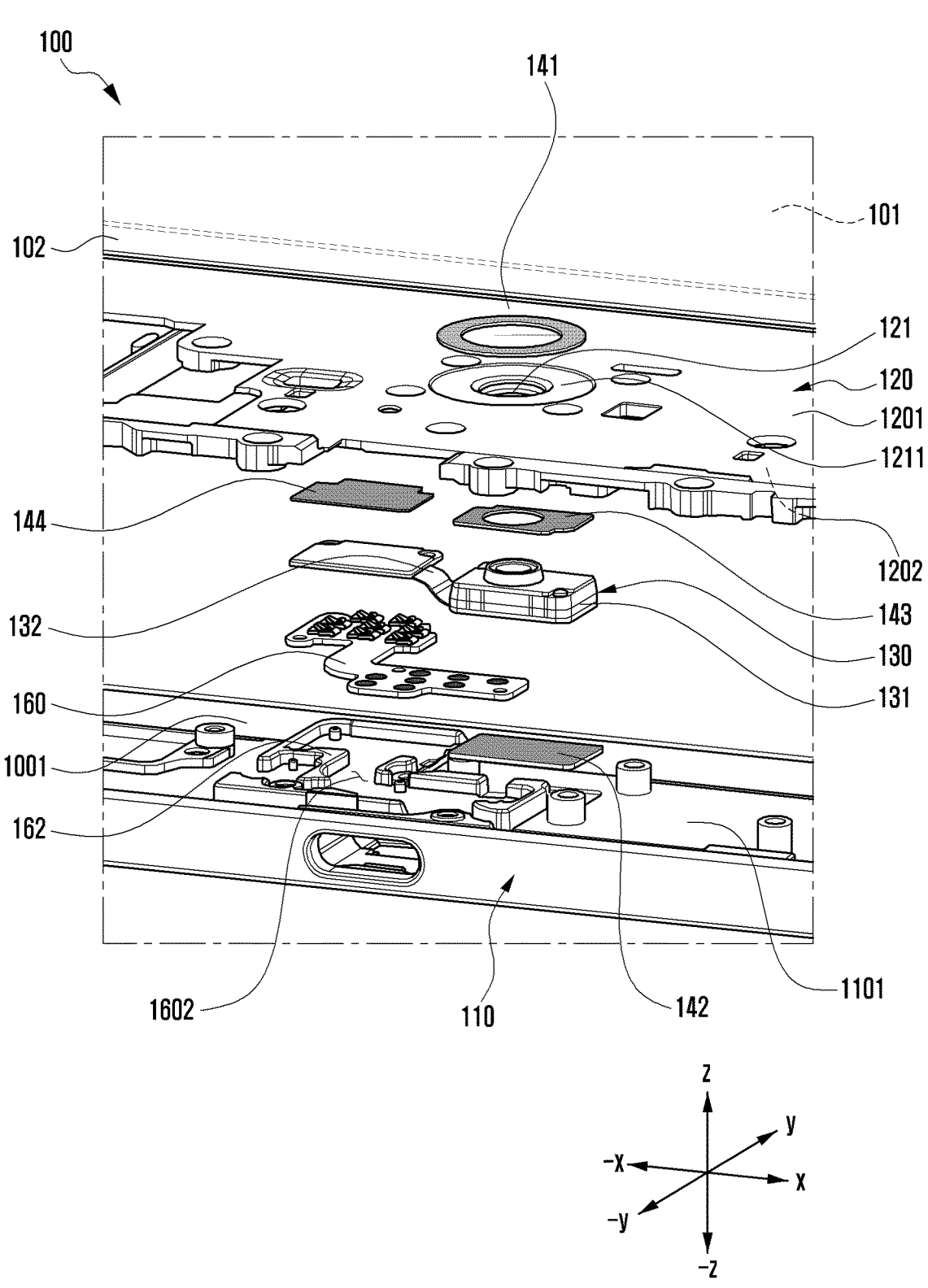
FIG. 7A is an exploded perspective view of an electronic device including a fingerprint sensor module according to various embodiments of the disclosure.
Figure 7B:
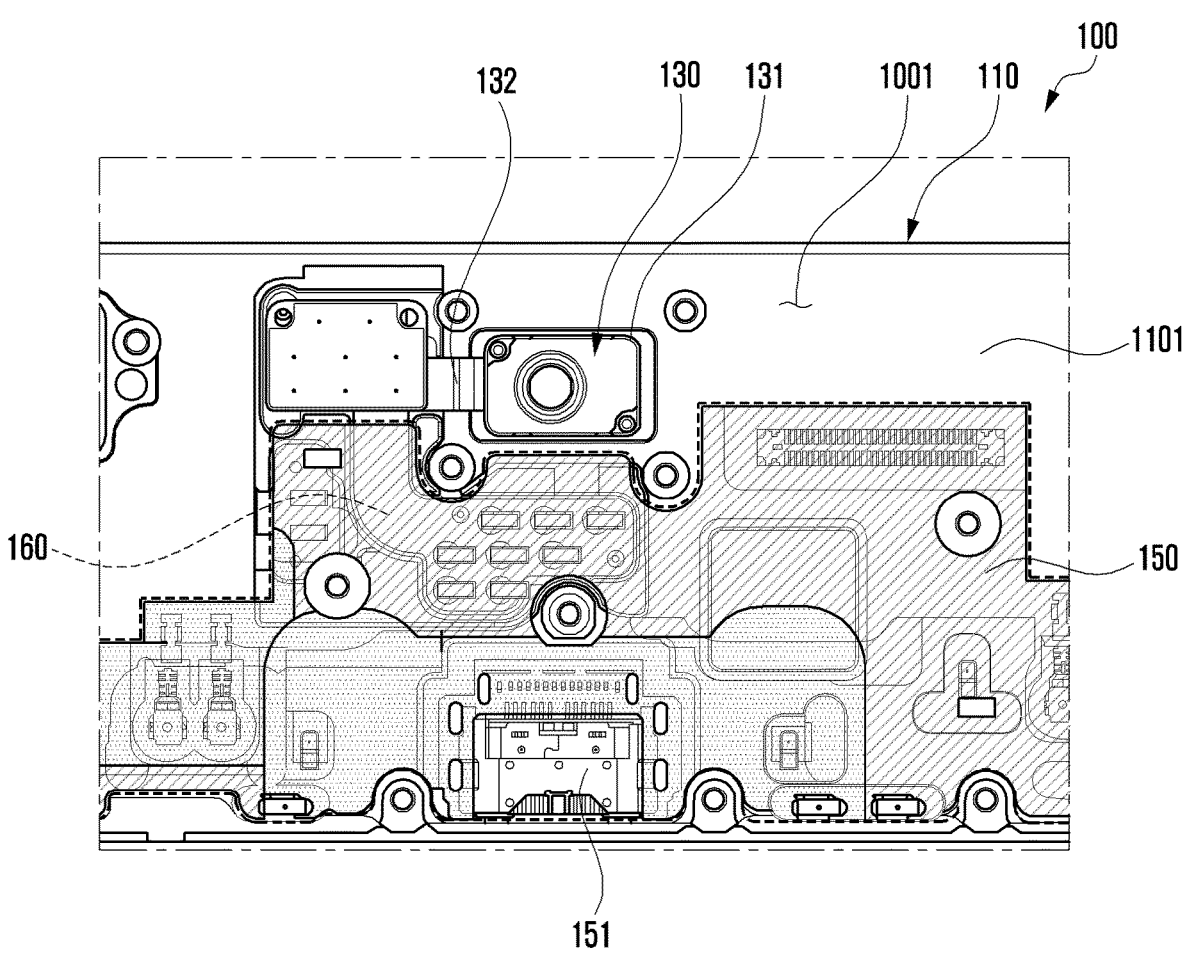
FIG. 7B is a partial configuration diagram of an electronic device illustrating a state in which a fingerprint sensor module and a printed circuit board are connected to each other via a bridge board according to various embodiments of the disclosure.

FIG. 7A is an exploded perspective view of an electronic device 100 including a fingerprint sensor module 130 according to various embodiments of the disclosure. FIG. 7B is a partial configuration diagram of an electronic device 100 illustrating a state in which a fingerprint sensor module 130 and a printed circuit board 150 are connected to each other via a bridge board 160 according to various embodiments of the disclosure.

In describing the electronic device 100 of FIGS. 7A and 7B, the same reference numerals are assigned to components that are substantially the same as those of the electronic device 100 of FIG. 4, and a detailed description thereof may be omitted.

Referring to FIGS. 7A and 7B, the electronic device 100 may include a guide unit 162 provided on the rear frame 1101 and configured to guide the bridge board 160. According to an embodiment, the guide unit 162 may be integrally formed with the rear frame 1101. In some embodiments, the guide unit 162 may be separately disposed on the rear frame 1101. According to an embodiment, by the provision of an arrangement space 1602 by the guide unit 162, the arrangement position of the bridge board 160 may be assigned. According to an embodiment, the arrangement space 1602 provided via the guide unit 162 may be helpful for aligning the electrical connecting portion (e.g., a conductive terminal and/or a conductive pad) of the fingerprint sensor module 130, which is disposed on the bridge board 160, to the FPCB 132 and the printed circuit board 150.

According to various embodiments, the printed circuit board 150 may be disposed to be spaced apart from the fingerprint sensor module 130 by a predetermined distance via the bridge board 160 in the inner space 1001 of the electronic device 100. According to an embodiment, the structure for disposing the fingerprint sensor module 130 and the printed circuit board 150 to be spaced apart from each other via the bridge board 160 may be helpful for layout design of one or more electronic components 151 disposed on the printed circuit board 150, connected to a connector (e.g., the connector 300 in FIG. 8) of an external device, or configured to detect an external environment. For example, the printed circuit board 150 may be disposed near a side member (e.g., the side member 118 in FIG. 1) of the electronic device 100 in the inner space 1001 of the electronic device 100 via an electrical connection structure based on the bridge board 160. According to an embodiment, the one or more electronic components 151 may include at least one of a receptacle, an ear jack assembly, a speaker module, a microphone module, and/or an external environment detection sensor module.

Figure 8:
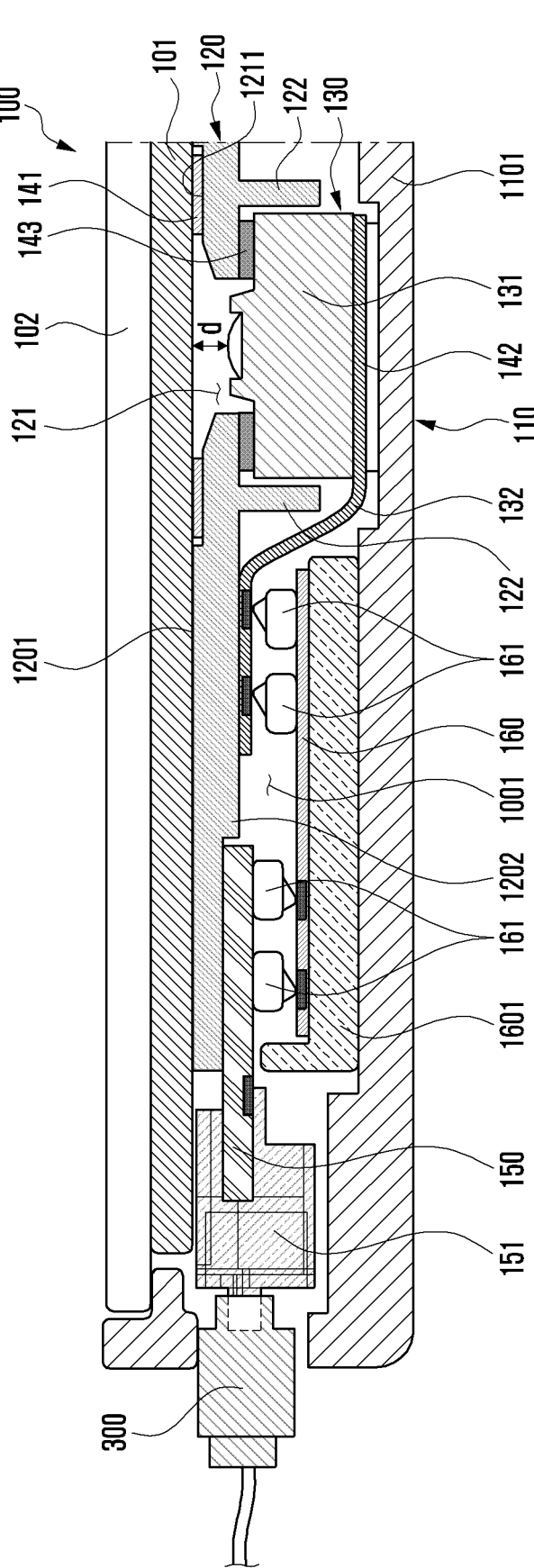
FIG. 8 is a partial cross-sectional view of an electronic device in which a fingerprint sensor module according to various embodiments of the disclosure is disposed.

FIG. 8 is a partial cross-sectional view of an electronic device 100 in which a fingerprint sensor module 130 according to various embodiments of the disclosure is disposed.

Referring to FIG. 8, in the assembled state of the electronic device 100, the display 101 may be supported by or on the first surface 1201 of the support frame 120, and the fingerprint sensor module 130 may be supported by or on the second surface 1202 of the support frame 120. In this case, the fingerprint sensor module 130 may be disposed at a position facing the display 101 through the through-hole 121 formed in the support frame 120 while maintaining a pre-determined distance.

According to various embodiments, the electronic device 100 may include a printed circuit board 150 spaced apart from the fingerprint sensor module 130 at a predetermined interval and disposed on the second surface 1202 of the support frame 120. According to an embodiment, the fingerprint sensor module 130 may be electrically connected to the printed circuit board 150 via the FPCB 132 drawn out from the module housing 131. According to an embodiment, the electronic device 100 may include a bridge board (bridge substrate) 160 fixed to the rear frame 1101 and electrically interconnecting the FPCB 132 of the fingerprint sensor module 130 and the printed circuit board 150. According to an embodiment, the printed circuit board 150 may be disposed to be spaced apart from the fingerprint sensor module 130 to a position at which the one or more electronic components 151 connected to an external environment may be mounted via the bridge board 160. According to an embodiment, the at least one electronic component 151 may include a receptacle connected to the connector 300 for data transmission/reception and/or charging with respect to an external electronic device.

Figure 9:
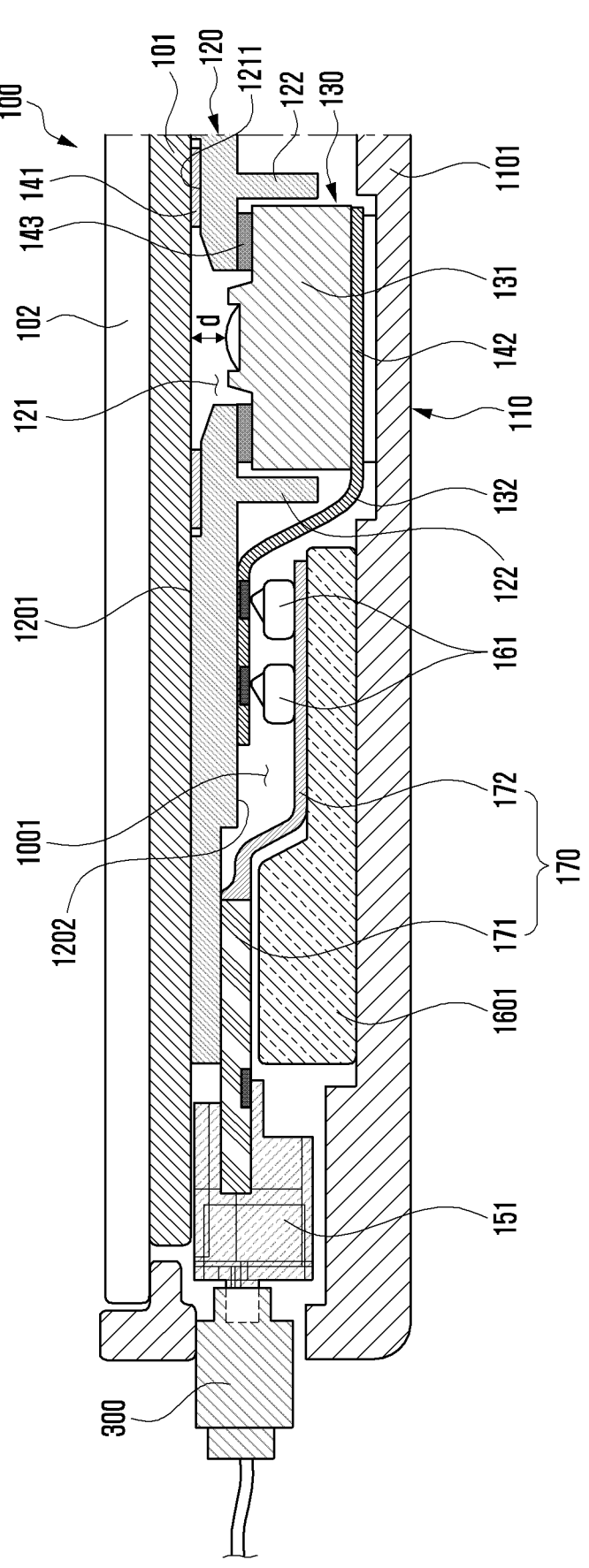
FIG. 9 is a partial cross-sectional view of an electronic device in which a fingerprint sensor module according to various embodiments of the disclosure is disposed.

FIG. 9 is a partial cross-sectional view of an electronic device 100 in which a fingerprint sensor module 130 according to various embodiments of the disclosure is disposed.

In describing the electronic device 100 of FIG. 9, the same reference numerals are assigned to components substantially the same as those of the electronic device 100 of FIG. 8, and a detailed description thereof may be omitted.

Referring to FIG. 9, in the assembled state of the electronic device 100, the display 101 may be supported by the first surface 1201 of the support frame 120, and the fingerprint sensor module 130 may be supported by the second surface 1202 of the support frame 120. In this case, the fingerprint sensor module 130 may be disposed at a position facing the display 101 through the through-hole 121 formed in the support frame 120 while maintaining a predetermined distance.

According to various embodiments, the electronic device 100 may include a printed circuit board 170 spaced apart from the fingerprint sensor module 130 at a predetermined interval and disposed on the second surface 1202 of the support frame 120. According to an embodiment, the fingerprint sensor module 130 may be electrically connected to the printed circuit board 170 via the FPCB 132 drawn out from the module housing 131. According to an embodiment, the printed circuit board 170 may include a rigid board portion (PCB) 171 fixed to the second surface 1202 of the support frame 120, and a flexible board portion (FPCB) 172 extending from the rigid board portion 171 and fixed to the rear frame 1101. According to an embodiment, the flexible board portion 172 may be configured integrally with the rigid board portion 171 by removing a portion of a dielectric layer of the rigid board portion 171 or adjusting the thickness of the dielectric layer. In some embodiments, the flexible board portion 172 may be attached to the rigid board portion 171 through conductive bonding and soldering. According to an embodiment, the printed circuit board 170 may be disposed to be spaced apart from the fingerprint sensor module 130 to a position at which the one or more electronic components 151 connected to an external environment may be mounted, via the ridge board portion 171, and may be electrically connected to a FPCB 132 in the vicinity of the fingerprint sensor module 130 via the flexible board portion 172.

Figure 10:
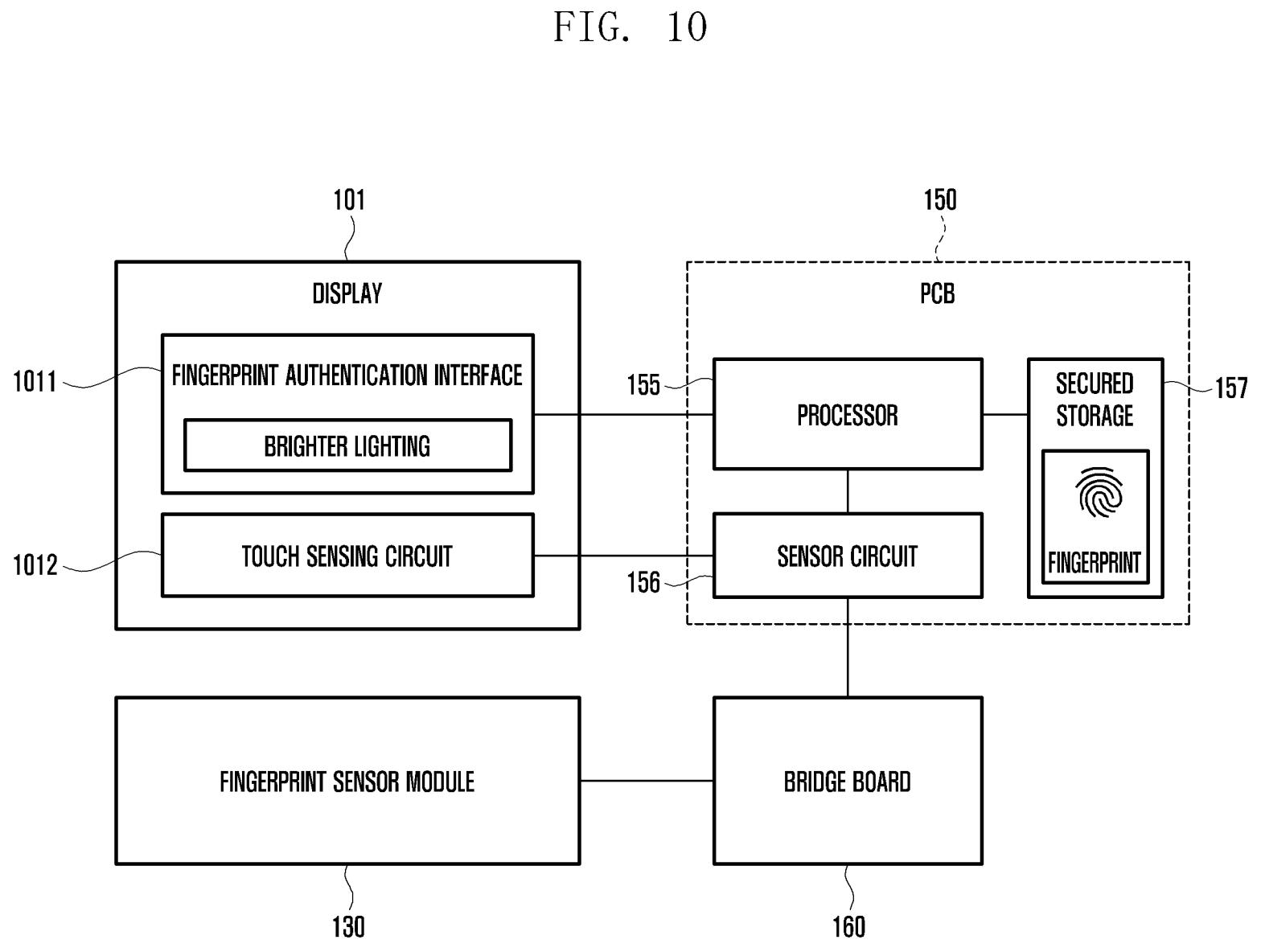

FIG. 10 is a block diagram of an electronic device 100 including a fingerprint sensor module 130 according to various embodiments of the disclosure.

Referring to FIG. 10, the electronic device 100 may include a processor 155, a sensor circuit 156 operatively connected to the processor 155, a memory 157, a display 101, and a fingerprint sensor module 130. According to an embodiment, the processor 155, the sensor circuit 156, and the memory 157 may be disposed on a printed circuit board 150. According to an embodiment, the display 101 may include a fingerprint authentication interface 1011 and a touch sensing circuit 1012 displayed on the display 101 under the control of the processor 155. According to an embodiment, the processor 155 of the printed circuit board 150 may be electrically connected to the fingerprint sensor module 130 via a bridge board 160. In some embodiments, the processor 155 may be directly electrically connected to the fingerprint sensor module 130 without the bridge board 160.

According to various embodiments, the processor 155 may extract feature information corresponding to a fingerprint image provided from the fingerprint sensor module 130 via the sensor circuit 156. According to an embodiment, the processor 155 may execute a user authentication process by comparing the feature information of a captured fingerprint image with a fingerprint feature information stored in the memory 157. According to an embodiment, the processor 155 may execute an unlocking screen or at least one application via the display 101 in response to a user authentication result. According to an embodiment, the processor 155 may receive a touch input signal for the fingerprint authentication interface 1011 from the touch sensing circuit 1012, and may provide the fingerprint authentication interface 1011 such as brighter lighting via the display 101. The processor 155 may provide brighter lighting in response to pre-stored brighter lighting area information. According to an embodiment, the processor 155 may display a lock screen in response to activation of the display 101 and provide the fingerprint authentication interface 1011 via a partial area of the lock screen. In some embodiments, the processor 155 may provide the fingerprint authentication interface 1011 to the display 101 regardless of the user's activation trigger based on the user's an always-on-display (AOD) mode setting state. In some embodiments, the processor 155 may activate the fingerprint sensor module 130 in response to a touch input signal from the touch sensing circuit 1012 in the fingerprint authentication interface 1011.

Figure 11:
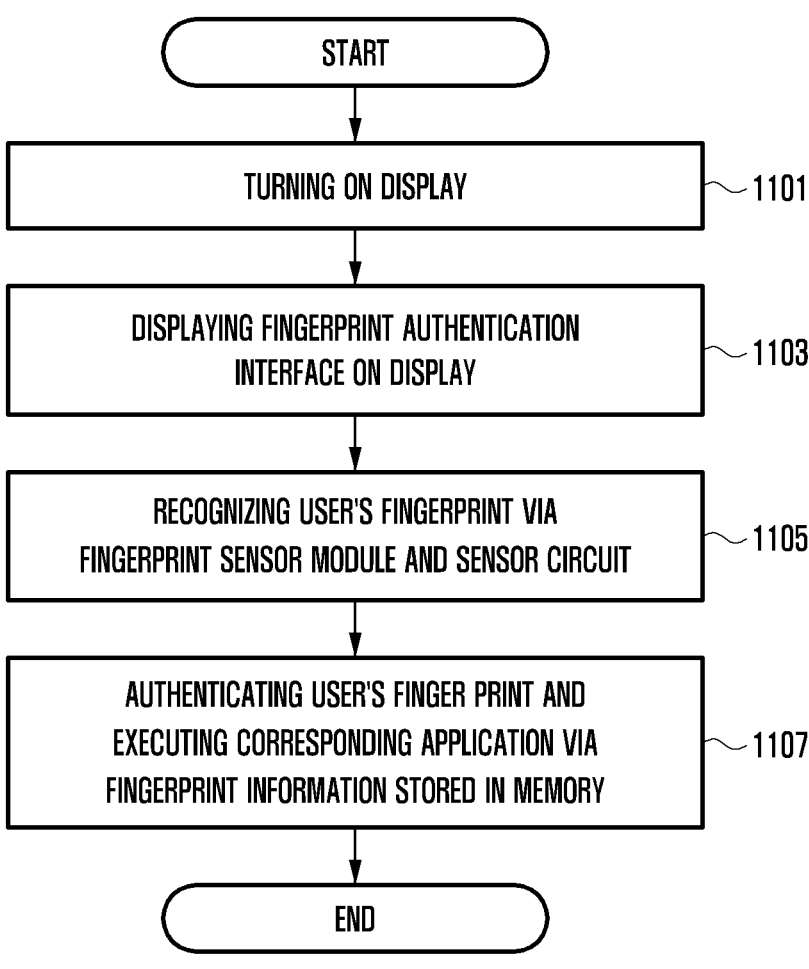
FIG. 11 is a flowchart illustrating an authentication procedure via a fingerprint sensor module according to various embodiments of the disclosure.

FIG. 11 is a flowchart illustrating an authentication procedure via a fingerprint sensor module 130 according to various embodiments of the disclosure.

Referring to FIG. 11, when the display 101 is switched from an OFF state to an ON state (operation 1101), the electronic device 100 (e.g., the processor 155) may display the fingerprint authentication interface 1011 (e.g., a fingerprint-shaped graphic object) in a partial display area in response to the fingerprint authentication setting (operation 1103). When the electronic device 100 is not in the fingerprint authentication setting state, an authentication interface (e.g., a face unlock interface or an iris recognition interface) other than the fingerprint authentication interface 1011 may be displayed. According to an embodiment, the electronic device 100 may temporarily generate brighter lighting than the fingerprint authentication interface area in response to a touch input signal for the area of the fingerprint authentication interface 1011. For example, referring to FIG. 1, the display 101 may be set to display gradient-type brighter lighting areas 1011*a* and 1011*b* with at least one color in an area corresponding to the fingerprint authentication interface 1011. According to an embodiment, the brighter lighting areas 1011*a* and 1011*b* may include a first brighter lighting area 1011*a* displayed in an area including at least the fingerprint authentication interface, and a second brighter lighting area 1011*b* disposed at least partially surround the first brighter lighting area 1011*a*. According to an embodiment, the brighter lighting areas 1011*a* and 1011*b* may be set as a gradient type in which saturation/brightness is adjusted in the same color from the first brighter lighting area 1011*a* to the second brighter lighting area 1011*b*. For example, the fingerprint authentication interface 1011 may be set to gradually become brighter or darker from the first brighter lighting area 1011*a* toward the second brighter lighting area 1011*b*. In some embodiments, the display 101 may display only the fingerprint authentication interface 1011 in a normal state. In some embodiments, the display 101 may be set to adjust the brightness of each area in a gradient type when a fingerprint is near, in addition to the fingerprint authentication interface 1011. In some embodiments, the brighter lighting areas 1011*a* and 1011*b* may have the same size as the fingerprint authentication interface 1011, or may be displayed to be smaller or larger than the fingerprint authentication interface 1011. In some embodiments, the brighter lighting areas 1011*a* and 1011*b* may be set to be displayed in an area corresponding to a touch input in real time.

According to various embodiments, the electronic device 100 may recognize a user's fingerprint received from the area of the fingerprint authentication interface 1011 (operation 1105). For example, the electronic device 100 may extract feature information corresponding to a captured fingerprint image from the fingerprint sensor module 130. According to an embodiment, the electronic device 100 may execute a user authentication process or a corresponding application by comparing the feature information of the captured fingerprint image with the fingerprint feature information stored in the memory 157 (operation 1107).

According to various embodiments, an electronic device (e.g., the electronic device 100 in FIG. 4) may include a housing (e.g., the housing 110 in FIG. 4), a support frame (e.g., the support frame 120 in FIG. 4) disposed in an inner space (e.g., the inner space 1001 in FIG. 4) of the housing, and including a first surface (e.g., the first surface 1201 in FIG. 4), a second surface (e.g., the second surface 1202 in FIG. 4) facing away from the first surface, and a through-hole (e.g., the through-hole 121 in FIG. 4), a display (e.g., the display 101 in FIG. 4) supported by the first surface and disposed to be visible from outside through at least a portion of the housing, and an optical sensor module (e.g., the fingerprint sensor module 130 in FIG. 4) disposed on the second surface to face the through-hole.

According to various embodiments, the optical sensor module may include a module housing (e.g., the module housing 131 in FIG. 4), at least one image sensor disposed in an inner space of the module housing, and configured to detect reflected light of a fingerprint approaching through the display, and a fingerprint sensor module including an FPCB (e.g., the FPCB 132 in FIG. 4) drawn out from the module housing to a predetermined length in a predetermined shape.

According to various embodiments, the electronic device may further include a pressure dispersion unit (e.g., the pressure dispersion unit 141 in FIG. 4) disposed between the first surface and the display in a loop shape to at least partially surround the periphery of the through-hole.

According to various embodiments, the pressure dispersion unit may be disposed in a recess (e.g., the recess 1211 in FIG. 4), which is formed in the first surface to be lower than the first surface, to a height that is at least flush with the first surface.

According to various embodiments, the pressure dispersion unit may be attached to the first surface of the support frame via an adhesive tape and may be in contact with the display.

According to various embodiments, the fingerprint sensor module may be fixed to the second surface via an adhesive tape disposed between the module housing and the second surface.

According to various embodiments, the electronic device may further include: a rear frame (e.g., the rear frame 1101 in FIG. 4) disposed under the fingerprint sensor module; and a buffer unit (e.g., the buffer unit 142 of FIG. 4) disposed between the module housing and the rear frame.

According to various embodiments, the electronic device may further include a support wall (e.g., the support wall 122 in FIG. 4) protruding from the second surface around the through-hole to at least partially surround the module housing.

According to various embodiments, the support wall may extend by a length supported by the rear frame.

According to various embodiments, the electronic device may further include a printed circuit board (e.g., the printed circuit board 150 in FIG. 4) disposed on the second surface of the support frame, wherein the FPCB is electrically connected to the printed circuit board.

According to various embodiments, the FPCB may be fixed to a position spaced apart from the printed circuit board by a predetermined distance on the second surface of the support frame, and the printed circuit board and the FPCB may be electrically connected to each other via the rear frame disposed on a bridge board (e.g., the bridge board 160 in FIG. 4) and at least one electrical connecting member (e.g., the electrical connecting member 161 in FIG. 4).

According to various embodiments, the printed circuit board may include at least one electronic component (e.g., the electronic component 151 in FIG. 8) disposed to be exposed outside in at least a portion of the housing.

According to various embodiments, the at least one electronic component may include at least one of a receptacle, an ear jack assembly, a speaker module, a microphone module, and/or an external environment detection sensor module.

According to various embodiments, the printed circuit board (e.g., the printed circuit board 170 in FIG. 9) may include a rigid board portion (e.g., the rigid board portion 171 in FIG. 9) disposed on the second surface of the support frame and a flexible board portion (e.g., the flexible board portion 172 in FIG. 9) fixed to the rear frame from the rigid board portion to a vicinity of the FPCB, wherein the flexible board portion may be electrically connected to the FPCB via an electrical connecting member.

According to various embodiments, the through-hole may overlap at least a portion of the display when the support frame is viewed from above.

According to various embodiments, the housing (e.g., the housing 110 in FIG. 1) may include a front cover (e.g., the front cover 102 in FIG. 1) oriented in a first direction (e.g., the z-axis direction in FIG. 1), a rear cover (e.g., the rear cover 111 in FIG. 2) oriented in a second direction (e.g., the −z-axis direction in FIG. 1) opposite to the first direction, and a side member (e.g., the side member 118 in FIG. 1) surrounding the inner space between the front cover and the rear cover, and the through-hole may overlap the front cover when the support frame is viewed from above.

According to various embodiments, the display may be disposed to be visible from the outside through at least a portion of the front cover.

According to various embodiments, an electronic device may include a housing, a display disposed to be visible from the outside through at least a portion of the housing, a support frame disposed under the display in the inner space of the housing and including a through-hole, and an optical sensor module fixed to the support frame to face the through-hole under the support frame.

According to various embodiments, the optical sensor module may include an FPCB drawn to a predetermined length, and the FPCB may be electrically connected to a printed circuit board disposed on the support frame.

According to various embodiments, the FPCB may be fixed to a position spaced apart from the printed circuit board by a predetermined distance on the support frame, and the printed circuit board and the FPCB may be electrically connected to each other via a bridge board disposed in the inner space and at least one electrical connecting member.

Various embodiments disclosed in this specification and drawings merely present specific examples in order to easily describe the technical contents according to the embodiments of the disclosure and to help understanding of the embodiments of the disclosure, and are not intended to limit the scope of the embodiments of the disclosure. Accordingly, the scope of the various embodiments of the disclosure should be construed in such a manner that, in addition to the embodiments disclosed herein, all changes or modifications derived from the technical idea of the various embodiments of the disclosure are included in the scope of the various embodiments of the disclosure.

What is claimed is:

1. An electronic device comprising:

a front cover;

a rear cover facing in a direction opposite to the front cover;

a support frame disposed in a space between the front cover and the rear cover, the support frame comprising a through-hole;

a display supported by the support frame and disposed to be visible from an outside of the electronic device through at least a portion of the front cover;

an optical sensor module disposed on the support frame between the support frame and the rear cover and corresponding to the through-hole; and a support wall extending from the support frame, the support wall protruding from the support frame toward the rear cover and disposed to surround at least a portion of the optical sensor module; and a pressure dispersion unit disposed in a loop shape to at least partially surround a periphery of the through-hole between the support frame and the display, wherein the pressure dispersion unit is attached to the support frame via a first adhesive member and is in contact with the display.

2. The electronic device of claim 1, wherein the optical sensor module comprises:

a module housing;

at least one image sensor disposed in an inner space of the module housing, and configured to detect an external environment through the display; and a flexible printed circuit board (FPCB) drawn out from the module housing.

3. The electronic device of claim 2, wherein the support wall protrudes from the support frame to at least partially surround the module housing around the through-hole.

4. The electronic device of claim 2, wherein the optical sensor module comprises a fingerprint sensor module, and wherein the fingerprint sensor module is fixed to the support frame via an adhesive tape.

5. The electronic device of claim 1, wherein the support wall is formed to have a length that contacts the rear cover with priority over the optical sensor module when the display is pressed.

6. The electronic device of claim 1, further comprising at least one screw through-hole disposed around the through hole in the support frame, wherein the support frame is fixed to the rear cover by fastening a screw penetrated through the at least one screw through hole.

7. The electronic device of claim 1, wherein the optical sensor module is fixed to the support frame through a screw.

8. The electronic device of claim 1, wherein the optical sensor module is fixed to the support frame and maintained at a specific interval from the rear cover.

9. The electronic device of claim 1, wherein pressure dispersion unit is disposed in a recess formed on a surface of the support frame, and wherein the recess is formed in the surface to be lower than the surface such that the pressure dispersion unit has a height that is at least flush with the surface when the pressure dispersion unit is disposed in the recess.

10. The electronic device of claim 1, further comprising a buffer unit disposed between the optical sensor module and the rear cover.

11. The electronic device of claim 10, wherein the buffer unit is attached to the optical sensor module and the rear cover via a second adhesive member.

12. The electronic device of claim 10, wherein the buffer unit is formed of an elastic material having relatively higher compressibility than the pressure dispersion unit.

13. The electronic device of claim 10, wherein the buffer unit is disposed in a recess formed to be lower than a surface of the rear cover.

14. The electronic device of claim 1, further comprising a printed circuit board (PCB) disposed on the support frame between the support frame and the rear cover, wherein the optical sensor module is electrically connected to the PCB through a FPCB drawn out from the optical sensor module.

15. The electronic device of claim 14, wherein the FPCB is fixed to a position spaced apart from the PCB by a predetermined distance on the support frame, and wherein the PCB and the FPCB are electrically connected to each other via a bridge board.

16. The electronic device of claim 15, wherein the bridge board is disposed on the rear cover.

17. The electronic device of claim 14, wherein the PCB comprises at least one electronic component disposed to be exposed to an exterior in at least a portion of the electronic device.

18. The electronic device of claim 17, wherein the at least one electronic component comprises at least one of a receptacle, an ear jack assembly, a speaker module, a microphone module and an external environment detection sensor module.

19. The electronic device of claim 1, wherein the through-hole overlaps at least a portion of the display when the support frame is viewed from above.

* * * * *